(12) United States Patent
Harakawa et al.

(10) Patent No.: US 12,085,967 B2
(45) Date of Patent: Sep. 10, 2024

(54) MOVEMENT SYSTEM AND POSITION ESTIMATION METHOD

(71) Applicant: Mitsubishi Electric Corporation, Tokyo (JP)

(72) Inventors: Tsubasa Harakawa, Tokyo (JP); Hiroshi Motomaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 176 days.

(21) Appl. No.: 17/912,523

(22) PCT Filed: Nov. 12, 2020

(86) PCT No.: PCT/JP2020/042318
§ 371 (c)(1),
(2) Date: Sep. 19, 2022

(87) PCT Pub. No.: WO2022/102068
PCT Pub. Date: May 19, 2022

(65) Prior Publication Data
US 2023/0213949 A1 Jul. 6, 2023

(51) Int. Cl.
*G05D 1/00* (2024.01)
*B23Q 17/22* (2006.01)
*G05D 3/12* (2006.01)

(52) U.S. Cl.
CPC ............... *G05D 3/12* (2013.01); *B23Q 17/22* (2013.01)

(58) Field of Classification Search
CPC ........... G05D 3/12; B23Q 17/22; G05B 19/19
See application file for complete search history.

(56) References Cited

U.S. PATENT DOCUMENTS

| | | | |
|---|---|---|---|
| 2019/0101904 A1 | 4/2019 | Shimamura et al. | |
| 2019/0121335 A1 | 4/2019 | Yoneda et al. | |
| 2020/0192407 A1* | 6/2020 | Yang | G05D 3/12 |
| 2022/0004160 A1* | 1/2022 | Kimura | G05B 19/41885 |

FOREIGN PATENT DOCUMENTS

| | | |
|---|---|---|
| JP | 9-235014 A | 9/1997 |
| JP | 9-249390 A | 9/1997 |
| JP | 2002-337037 A | 11/2002 |

(Continued)

OTHER PUBLICATIONS

International Search Report and Written Opinion mailed on Jan. 19, 2021, received for PCT Application PCT/JP2020/042318, filed on Nov. 12, 2020, 8 pages including English Translation.

(Continued)

*Primary Examiner* — Muhammad S Islam
(74) *Attorney, Agent, or Firm* — XSENSUS LLP (57) ABSTRACT

A servomotor (20) is driven to move a machine (10) with a ball screw (30). A first sensor (50) detects presence of the machine (10) at a first reference position (P) being predefined. A controller (60) stores a state of the servomotor (20) detected by an encoder (40) as reference state information upon detection of the machine (10) by the first sensor (50). The controller (60) estimates a position of the machine (10) based on the state of the servomotor (20) detected by the encoder (40) and the reference state information.

6 Claims, 7 Drawing Sheets

(56) References Cited

FOREIGN PATENT DOCUMENTS

| | | |
|---|---|---|
| JP | 2019-67046 A | 4/2019 |
| JP | 2019-79344 A | 5/2019 |

OTHER PUBLICATIONS

Notice of Reasons for Refusal mailed on May 18, 2021, received for JP Application 2021-512821, 6 pages including English Translation.
Notice of Reasons for Refusal mailed on Jun. 29, 2021, received for JP Application 2021-512821, 6 pages including English Translation.

* cited by examiner

| DETECTION DATE AND TIME | DETECTION RESULT |
|---|---|
| 2020/05/10 12:00:00 | UNDETECTED |
| 2020/05/10 12:00:01 | DETECTED |
| 2020/05/10 12:00:02 | DETECTED |
| 2020/05/10 12:00:03 | UNDETECTED |
| ⋮ | ⋮ |

FIG. 5

| DETECTION DATE AND TIME | ROTATION AMOUNT |
|---|---|
| 2020/05/10 12:00:00 | 100 |
| 2020/05/10 12:00:01 | 105 |
| 2020/05/10 12:00:02 | 112 |
| 2020/05/10 12:00:03 | 108 |
| ⋮ | ⋮ |

FIG. 6

| AREA NAME | START POINT | END POINT | IN-AREA PROCESS |
|---|---|---|---|
| AREA a | 50 | 75 | ALARM SOUND OUTPUT |

MOVEMENT SYSTEM AND POSITION ESTIMATION METHOD

CROSS-REFERENCE TO RELATED APPLICATION

The present application is based on PCT filing PCT/JP2020/042318, filed Nov. 12, 2020, the entire contents of which are incorporated herein by reference.

TECHNICAL FIELD

The present disclosure relates to a movement system and a position estimation method.

BACKGROUND ART

Known systems for factory production lines include machines such as robots and machining equipment that move in accordance with a work process to machine and transport target workpieces. In such systems, the position of a movable object such as a moving machine is to be detected accurately to avoid collision between the machine and a worker or equipment, for example. Various techniques are known for detecting the position of a movable object such as a moving machine.

For example, Patent Literature 1 describes a technique of using a linear scale to detect the position of a movable object such as a machine tool. With another known technique, the position of a movable object is detected with sensors installed at predetermined positions.

CITATION LIST

Patent Literature

Patent Literature 1: Unexamined Japanese Patent Application Publication No. 2002-337037

SUMMARY OF INVENTION

Technical Problem

Although the technique described in Patent Literature 1 allows relatively accurate position detection, the system includes the linear scale placed along the overall movement path of the machine, and thus is large and costly.

The use of the sensors is also costly, with many sensors distributed uniformly along the movement path of the machine to achieve accurate position detection.

In response to the above issue, an objective of the present disclosure is to provide a movement system and a position estimation method that can accurately estimate the position of a moving movable object with less cost than known systems or methods.

Solution to Problem

To achieve the above objective, a movement system according to an aspect of the present disclosure includes drive means for moving a movable object when being driven, first detection means for detecting presence of the movable object at a first reference position being predefined, state detection means for detecting a state of the drive means, and a controller to receive an input of information from the first detection means and the state detection means. The controller includes reference state storage means for storing the state of the drive means detected by the state detection means as reference state information upon detection of the movable object by the first detection means, and position estimation means for estimating a position of the movable object based on the state of the drive means detected by the state detection means and the reference state information.

Advantageous Effects of Invention

The system according to the above aspect of the present disclosure allows accurate estimation of the position of a moving movable object with less cost than known systems.

DESCRIPTION OF EMBODIMENTS

Embodiments of the present disclosure are described below in detail with reference to the drawings. In the drawings, the same reference signs denote the same or corresponding components.

Embodiment 1

Figure 1:
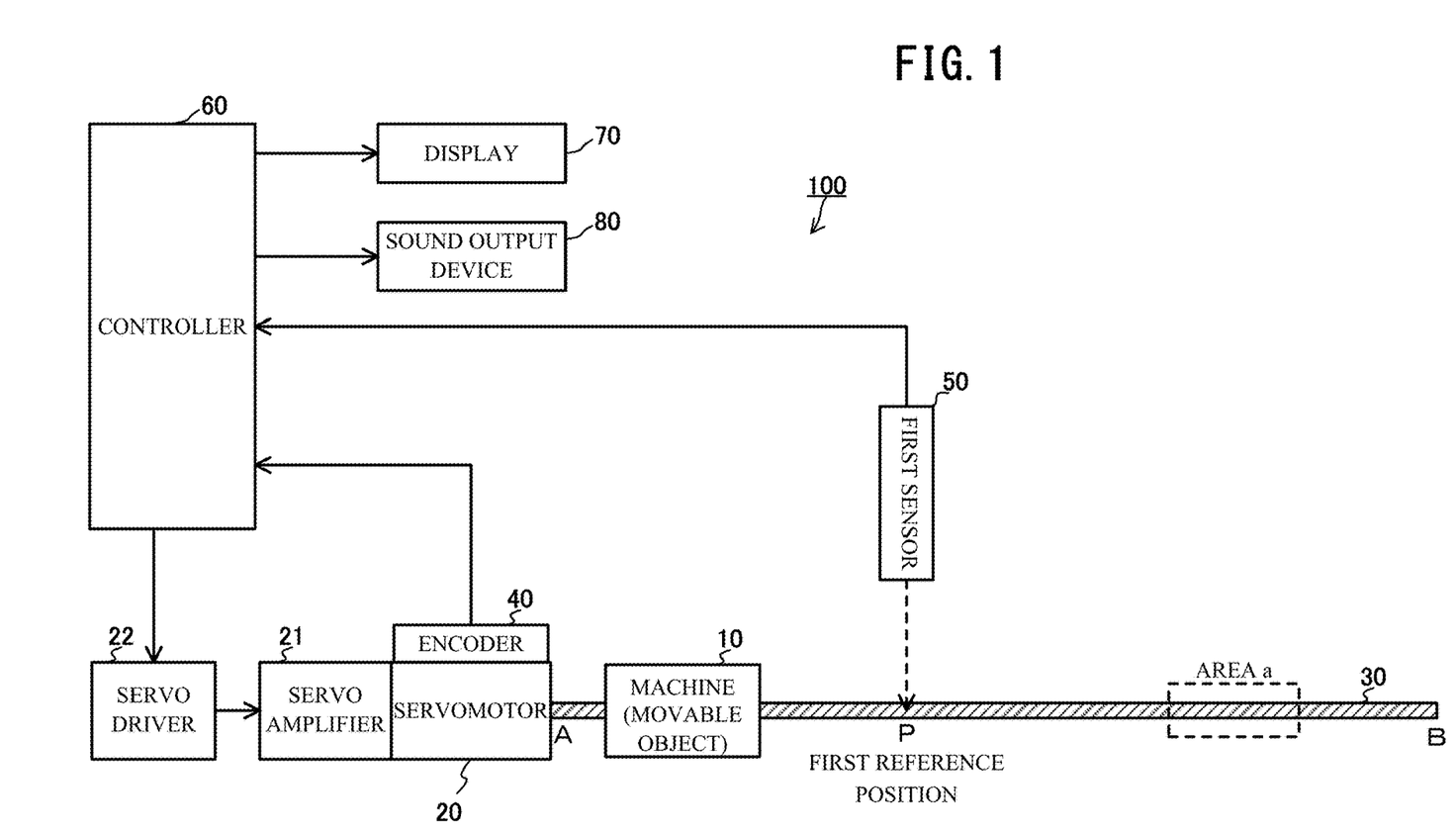
FIG. 1 is a schematic diagram of a movement system according to Embodiment 1 of the present disclosure.

FIG. 1 is a schematic diagram of a movement system 100 according to Embodiment 1 of the present disclosure illustrating the overall configuration. The movement system 100 is, for example, installed on a production line at a factory to move a machine 10 that is a movable object, such as a robot or a machine tool. The movement system 100 includes a servomotor 20, a servo amplifier 21, a servo driver 22, a ball screw 30, an encoder 40, a first sensor 50, a controller 60, a display 70, and a sound output device 80.

The servomotor 20 is driven based on a control signal received from the controller 60 through the servo driver 22 and the servo amplifier 21. The servomotor 20 is driven to move the machine 10 with the ball screw 30 (described below). The servomotor 20 is an example of drive means in an aspect of the present disclosure.

The ball screw 30 includes, for example, a screw shaft, a nut, and a ball (not illustrated). The screw shaft of the ball screw 30 is connected to the shaft of the servomotor 20 with a coupling (not illustrated). The machine 10 is fixed to a stage (not illustrated) on the nut of the ball screw 30. The servomotor 20 is driven to rotate the screw shaft of the ball screw 30, moving the machine 10 in a direction along the screw shaft, or more specifically, in a lateral direction in FIG. 1, from a start point A to an end point B of the ball screw 30. The ball screw 30 is an example of movement means in an aspect of the present disclosure.

The encoder 40 is a rotary encoder attached to the servomotor 20. The encoder 40 detects the state of the servomotor 20 every second and outputs the detected state to the controller together with the date and time of the detection. More specifically, the encoder 40 detects the rotation amount of the servomotor 20 as the state of the servomotor 20. As described above, the servomotor 20 is driven to move the machine 10. The rotation amount of the servomotor 20 thus corresponds to the movement of the machine 10. The movement amount of the machine 10 per unit of rotation is precalculated. The encoder 40 is an example of state detection means in an aspect of the present disclosure. For the machine 10 moving to the right in FIG. 1, the rotation amount of the servomotor 20 is indicated with a positive numerical value. For the machine 10 moving to the left, the rotation amount of the servomotor 20 is indicated with a negative numerical value.

The first sensor 50 is, for example, an optoelectronic switch or a proximity switch. The first sensor 50 detects any presence of the machine 10 at a first reference position P every second and outputs the detection result and the detection time to the controller 60. The first reference position P is defined with the system through a presetting process. The first sensor 50 is an example of first detection means in an aspect of the present disclosure.

The encoder 40 and the first sensor 50 are time-synchronized with each other, and perform detection at the same time and output the detection results to the controller 60. In one example, time synchronization is performed based on a standard such as IEEE802.1AS or IEEE1588. With the standard, the first sensor 50 and the encoder 40 receive signals for time synchronization from an external server to synchronize the internal clocks. This allows highly accurate position estimation.

Figure 2:
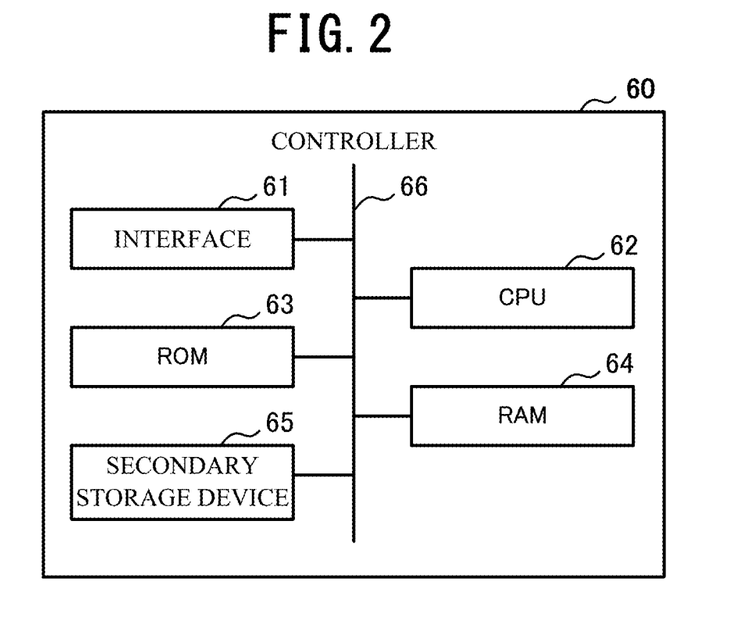
FIG. 2 is a block diagram of a controller in Embodiment 1 of the present disclosure.

The controller 60 is connected to the first sensor 50, the encoder 40, the display 70, the sound output device 80, and the servo driver 22 with wires or wirelessly. The controller 60 is a computer that performs, for example, a process of transmitting a control signal to the servomotor 20 through the servo driver 22 to drive the servomotor 20 to move the machine 10 and a position estimation process of estimating the position of the machine 10 during movement. As illustrated in FIG. 2, the controller 60 includes an interface 61, a central processing unit (CPU) 62, a read-only memory (ROM) 63, a random-access memory (RAM) 64, and a secondary storage device 65. These components are connected to one another with a bus 66.

The interface 61 allows the controller 60 to be connected with the first sensor 50, the encoder 40, the servo driver 22, the display 70, and the sound output device 80.

The CPU 62 centrally controls the controller 60. In the position estimation process described later, the CPU 62 estimates the position of the machine 10 based on the rotation amount indicated by reference state information and the rotation amount of the servomotor 20 acquired by the encoder 40, determines whether the estimated position is within a specific area, and performs a process corresponding to the area when the position is within the area. The CPU 62 is an example of position estimation means, area determination means, or area processing means in an aspect of the present disclosure.

The ROM 63 stores, for example, multiple pieces of firmware, data used upon execution of the firmware, and a control program for the CPU 62 to perform the processes described later. The RAM 64 is used as a work area for the CPU 62.

Figure 3:
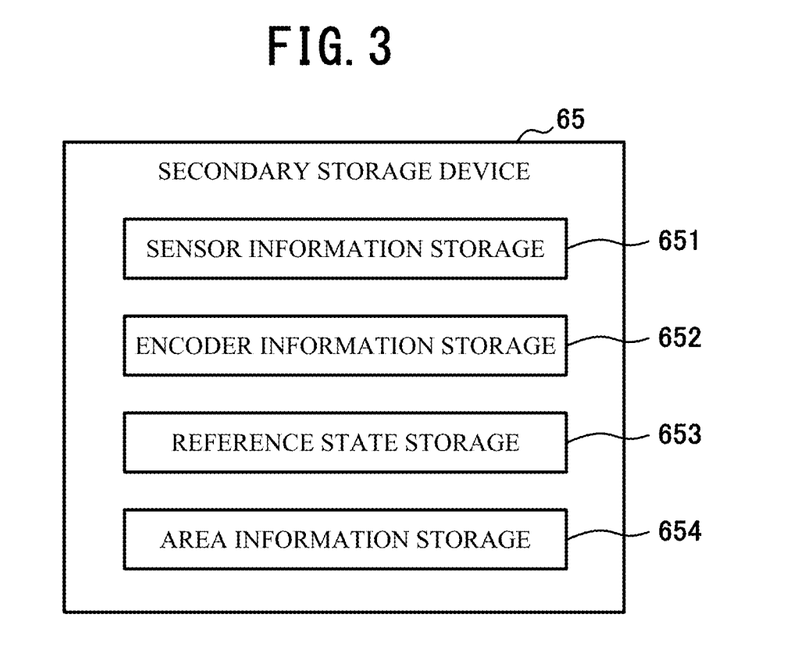
FIG. 3 is a diagram of a secondary storage device in the controller in Embodiment 1 of the present disclosure, illustrating information stored in the secondary storage device.

The secondary storage device 65 includes a readable and writable non-volatile semiconductor memory such as an electrically erasable programmable read-only memory (EEPROM) and a flash memory, or a hard disk drive (HDD). As illustrated in FIG. 3, the secondary storage device 65 includes a sensor information storage 651, an encoder information storage 652, a reference state storage 653, and an area information storage 654.

Figure 4:
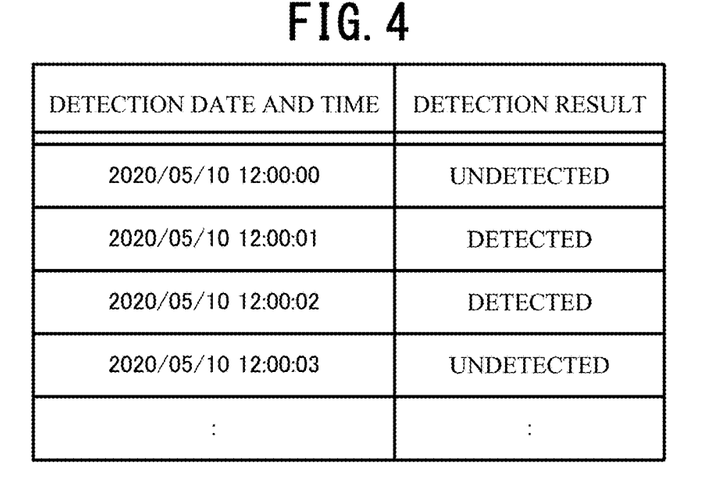
FIG. 4 is a table illustrating example information stored in a sensor information storage in Embodiment 1 of the present disclosure.

As illustrated in FIG. 4, the sensor information storage 651 stores the detection results indicating any presence of the machine 10 received from the first sensor 50 every second in a chronological order. Each detection result is associated with the detection date and time. In other words, the controller 60 receives an input of information from the first sensor 50.

Figure 5:
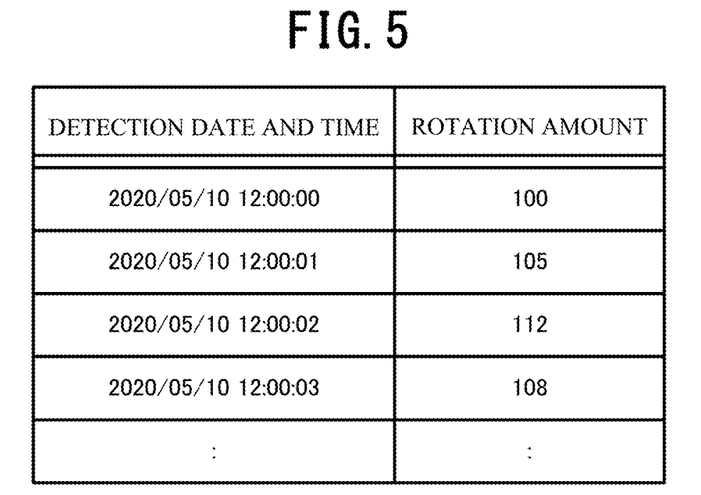
FIG. 5 is a table illustrating example information stored in an encoder information storage in Embodiment 1 of the present disclosure.

As illustrated in FIG. 5, the encoder information storage 652 stores pieces of information each indicating the rotation amount of the servomotor 20 received from the encoder 40 every second in a chronological order. Each rotation amount is associated with the detection date and time. In other words, the controller 60 receives an input of information from the encoder 40.

The reference state storage 653 stores the reference state information. The reference state information indicates the state of the servomotor 20 when the machine 10 is at the first reference position P. In the present embodiment, the reference state information indicates the rotation amount of the servomotor 20. The reference state storage 653 is an example of reference state storage means in an aspect of the present disclosure.

Figure 6:
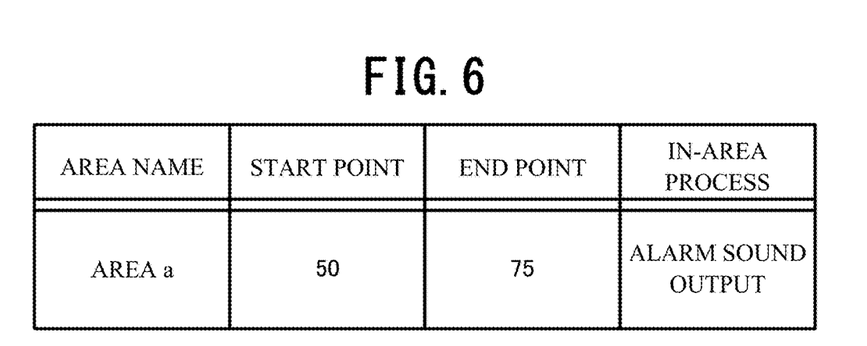
FIG. 6 is a table illustrating example information stored in an area information storage in Embodiment 1 of the present disclosure.

The area information storage 654 stores area information defining a specific area within a movable range of the machine 10. For example, as illustrated in FIG. 6, the area information includes an area name, coordinate values of the start point and the end point of the area, and a process to be performed. The coordinate values of the start point and the end point in the figure are values in a one-dimensional coordinate system with the start point A of the ball screw 30 being 0 and the end point B of the ball screw 30 being 100. The coordinate values illustrated in FIG. 6 indicate that the range of the area a is a portion enclosed by a dotted line illustrated in FIG. 1. An in-area process refers to a process performed when the machine 10 is in this area. Although one area alone is defined in the area information illustrated in FIG. 6, multiple areas may be defined in the area information. The area information storage 654 is an example of area information storage means in an aspect of the present disclosure.

Referring back to FIG. 1, the display 70 is, for example, a liquid crystal display (LCD). The display 70 displays various items of information as instructed by the controller 60. For example, the display 70 displays the position of the machine 10 estimated in the position estimation process described later.

The sound output device 80 is, for example, a speaker. The sound output device 80 outputs various sounds, such as a notification sound or an alarm sound, as instructed by the controller 60.

A process performed by the controller 60 in the movement system 100 is described. A reference state registration process is first described. The controller 60 performs the reference state registration process illustrated in FIG. 7 when, for example, the controller 60 is turned on for the first time or when the settings in the controller 60 are reset and the reference state information stored in the reference state storage 653 is deleted.

Figure 7:
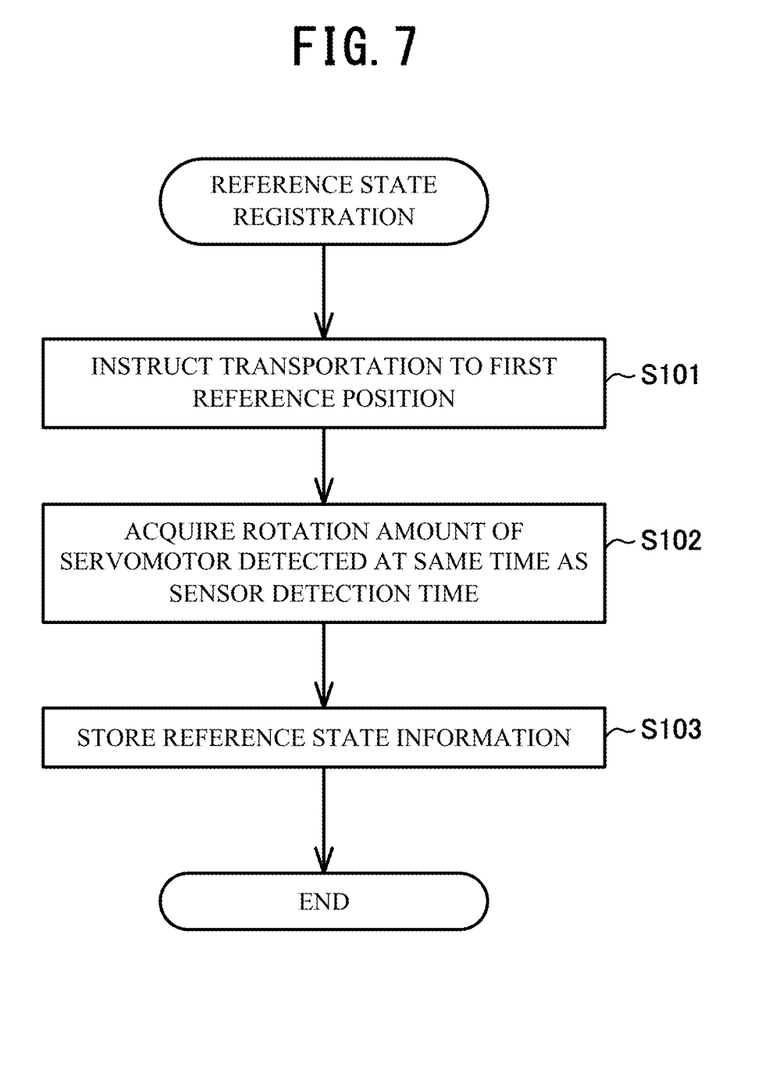
FIG. 7 is a flowchart of a reference state registration process in Embodiment 1 of the present disclosure.

The CPU 62 in the controller 60 first transmits a control signal for moving the machine 10 to the first reference position P to the servomotor 20 through the servo driver 22 and the servo amplifier 21 (step S101). The servomotor 20 is driven based on the received control signal, causing the screw shaft of the ball screw 30 to rotate. This moves the machine to the first reference position P.

Subsequently, when the machine 10 moved to the first reference position P is detected by the first sensor 50, the CPU 62 acquires the rotation amount of the servomotor 20 detected by the encoder 40 at the same time as the detection time of the machine 10 at the first reference position P (step S102). The CPU 62 then stores the rotation amount acquired in step S102 into the reference state storage 653 as the reference state information (step S103). The reference state registration process then ends.

Figure 8:
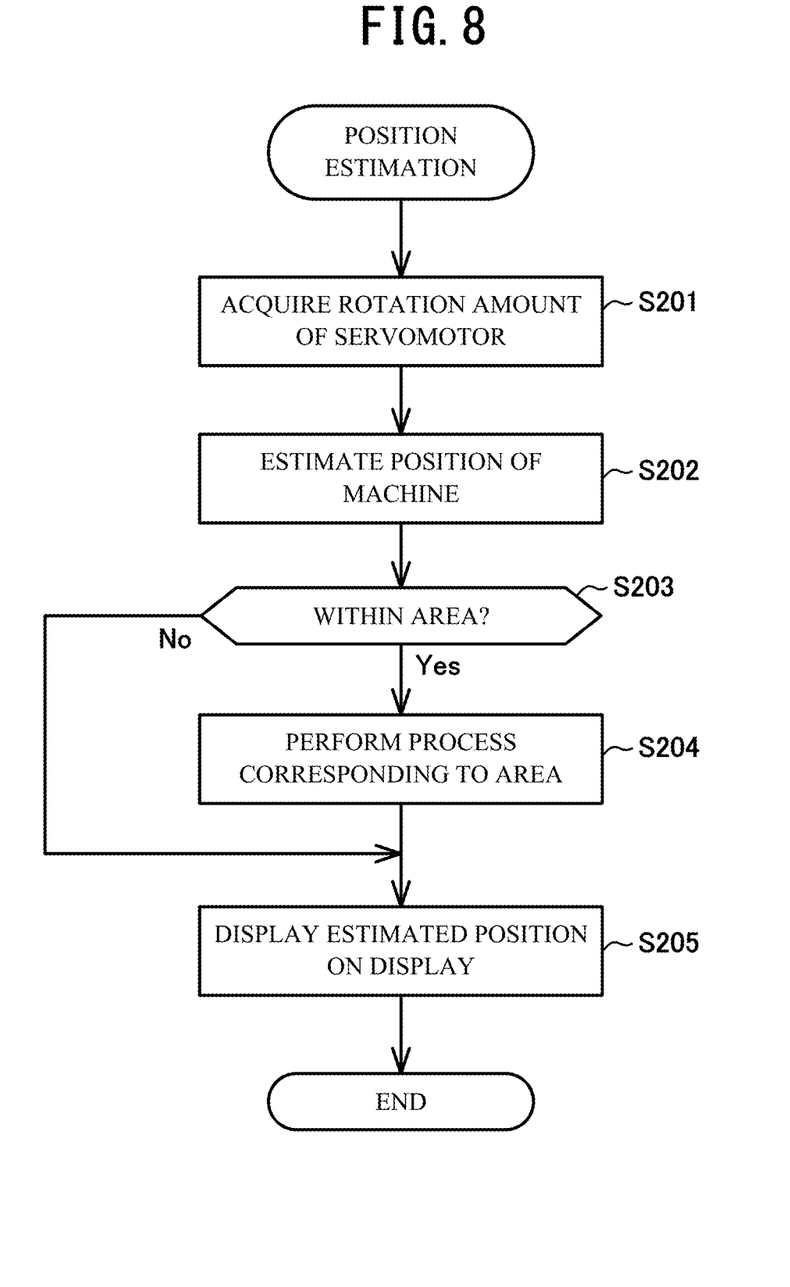
FIG. 8 is a flowchart of a position estimation process in Embodiment 1 of the present disclosure.

The position estimation process performed by the controller 60 is described with reference to the flowchart in FIG. 8. The position estimation process is repeated every second while, for example, the factory production line is in operation and the machine 10 is moving in accordance with a work process.

The CPU 62 in the controller 60 first refers to the encoder information storage 652 to acquire the current rotation amount of the servomotor 20 (step S201).

The CPU 62 then estimates the current position of the machine 10 based on the rotation amount acquired in step S201 and the rotation amount indicated by the reference state information stored in the reference state storage 653 in the secondary storage device 65 (step S202). More specifically, the CPU 62 calculates the difference between the two rotation amounts and estimates that the machine 10 is at a point away from the first reference position P by the distance corresponding to the calculated difference.

The CPU 62 then determines whether the machine 10 is within the area by referring to the area information stored in the area information storage 654 (step S203). More specifically, the CPU 62 may determine whether the position of the machine 10 estimated in step S202 is included in the range from the start point to the end point of the area indicated by the area information.

When the machine 10 is out of the area (No in step S203), the processing advances to step S205. When the machine 10 is within the area (Yes in step S203), the CPU 62 performs the process corresponding to this area. More specifically, the CPU 62 performs the process specified in the in-area process in the corresponding area information. For example, for the machine 10 being within the area a illustrated in FIG. 6, the CPU 62 causes the sound output device 80 to output an alarm sound. The processing then advances to step S205.

In step S205, the CPU 62 causes the display 70 to display the position of the machine 10 estimated in step S202. As described above, the position estimation process is repeated every second, thus allowing the display 70 to display the current estimated position of the machine 10 almost in real time. The position estimation process then ends.

In the present embodiment described above, the encoder 40 that detects the state of the servomotor 20 and the first sensor 50 that detects any presence of the machine 10 at the first reference position P are time-synchronized with each other. The state of the encoder 40 when the first sensor 50 detects the machine 10 at the first reference position P is stored as the reference state information. The servomotor 20 is then driven to cause the machine 10 to move. In this state, the state of the encoder 40 is reacquired to estimate the position of the machine 10 based on the state of the encoder 40 included in the reference state information and the state of the reacquired encoder 40. In other words, this structure eliminates, for example, the use of a large device such as a linear scale or multiple sensors, thus allowing accurate estimation of the position of a moving movable object with less cost than known structures.

Embodiment 2

Figure 9:
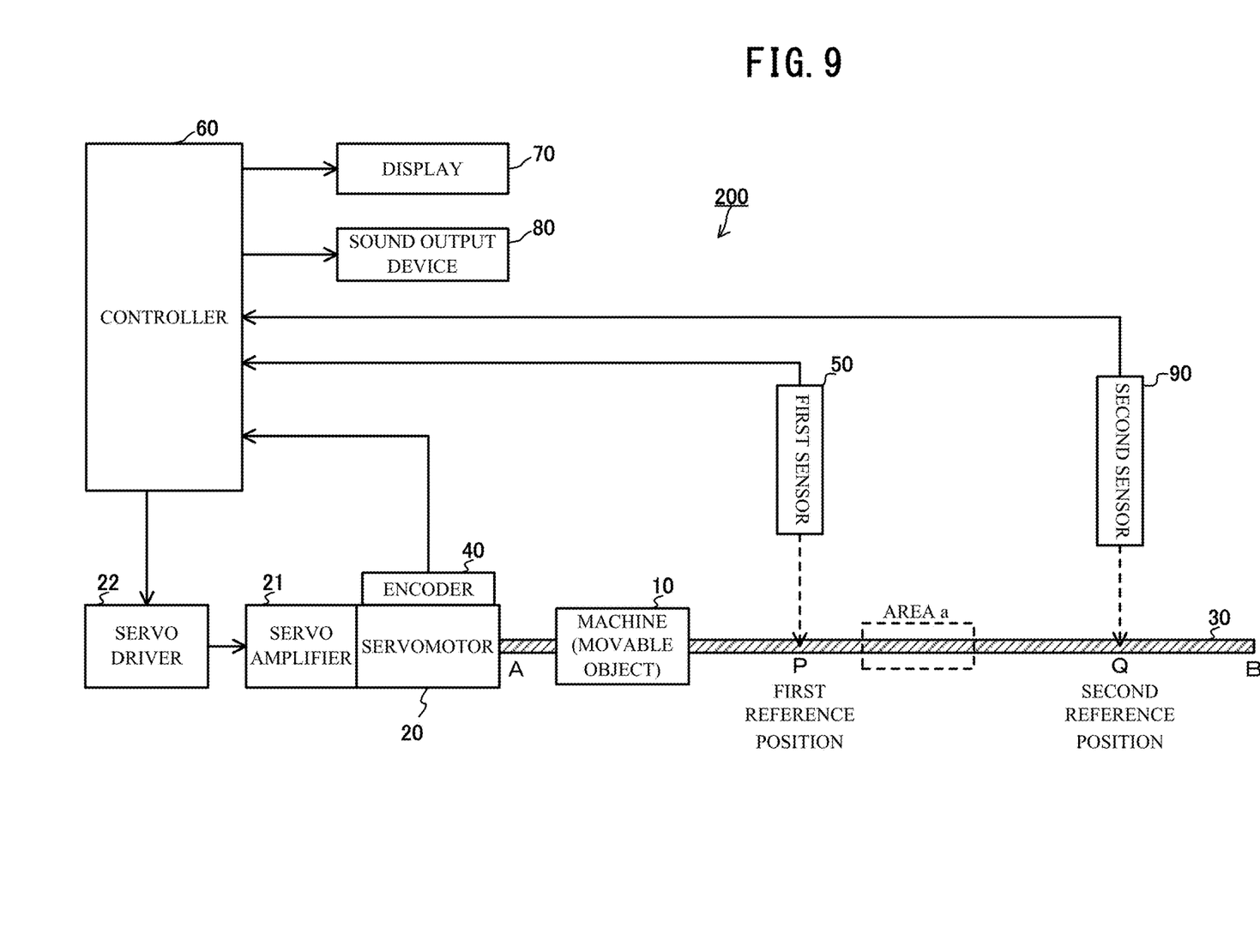
FIG. 9 is a schematic diagram of a movement system according to Embodiment 2 of the present disclosure.

Embodiment 2 of the present disclosure is described. FIG. 9 is a diagram of a movement system 200 according to Embodiment 2, illustrating the overall configuration.

The movement system 200 differs from the movement system 100 according to Embodiment 1 in including a second sensor 90.

Similarly to the first sensor 50, the second sensor 90 detects any presence of the machine 10 at a second reference position Q every second and outputs the detection result and the detection time to the controller 60. The second sensor 90 is an example of second detection means in an aspect of the present disclosure. The second reference position Q is defined with the system through a presetting process. The second sensor 90 and the first sensor 50 are time-synchronized with each other and output the detection results to the controller 60 at the same time. The detection result from the first sensor 50 and the detection result from the second sensor 90 are stored into the sensor information storage 651 in the controller 60 in a manner distinguishable from each other.

The second reference position Q may be located at the first reference position P. In this case, the first sensor 50 can detect the machine 10 at both the first reference position P and the second reference position Q. The second sensor 90 may thus be eliminated.

Figure 10:
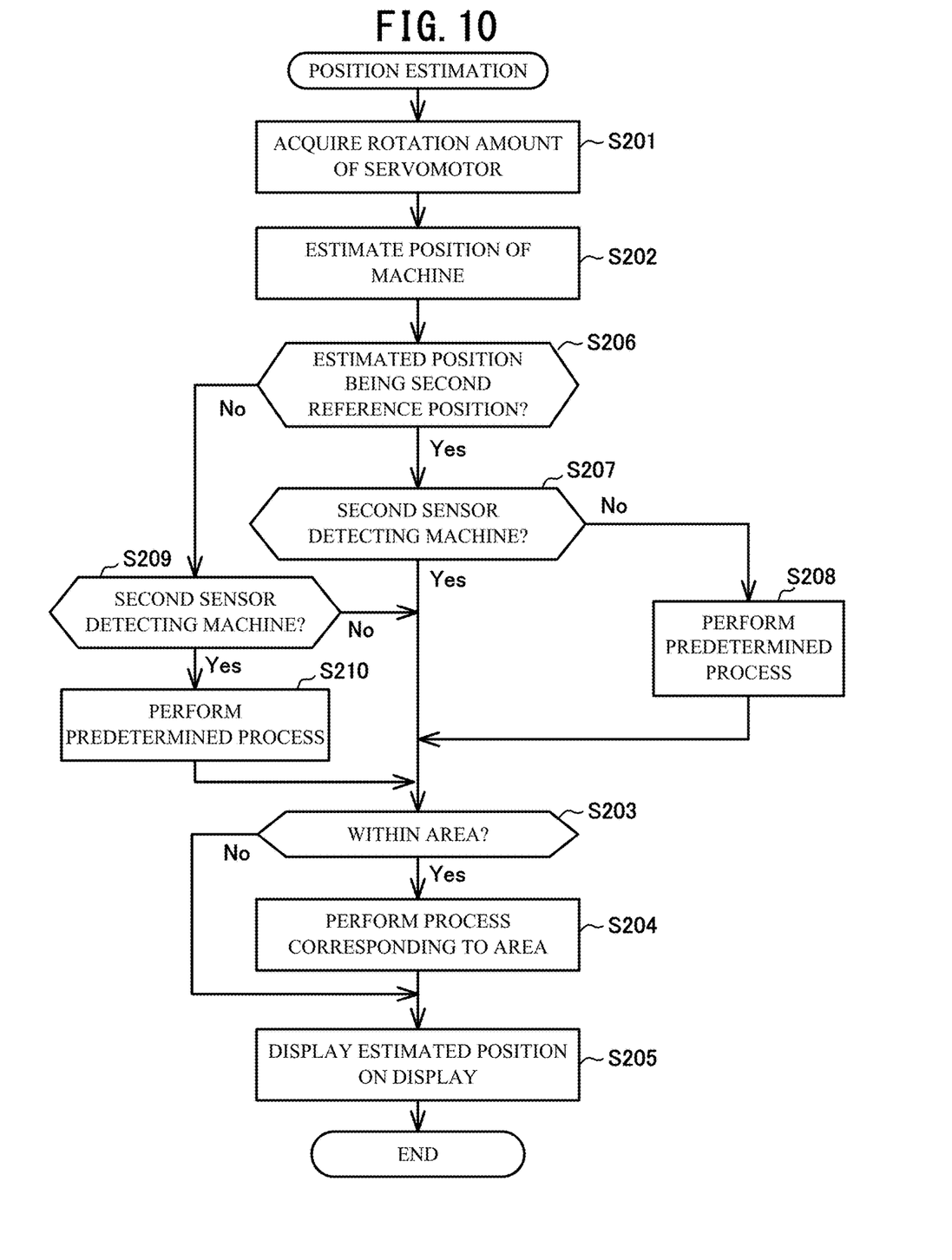
FIG. 10 is a flowchart of a position estimation process in Embodiment 2 of the present disclosure.

A position estimation process performed in the present embodiment is described with reference to the flowchart in FIG. 10. The same step numbers denote the steps common to the steps in the position estimation process in Embodiment 1, and such steps are not described or are described briefly.

The CPU 62 in the controller 60 first acquires the rotation amount of the servomotor 20 (step S201) and estimates the current position of the machine 10 (S202).

The CPU 62 then determines whether the position estimated in step S202 is the second reference position Q (step S206).

When the position estimated in step S202 is the second reference position Q (Yes in step S206), the CPU 62 determines whether the second sensor 90 detects the machine 10 (step S207).

When the second sensor 90 does not detect the machine 10 (No in step S207), the position estimated in step S202 is likely to have an error. The CPU 62 thus performs a process predetermined for such a case (step S208). For example, the CPU 62 causes, as the predetermined process, the sound output device 80 to output an alarm sound, or the CPU 62 stops or decelerates the movement of the machine 10. The processing then advances to step S203. When the movement of the machine 10 is stopped by the predetermined process, the position estimation process may be terminated.

When the second sensor 90 detects the machine 10 (Yes in step S207), the position estimated in step S202 is less likely to have an error. The processing advances to step S203.

Returning to step S206, when the estimated position is not the second reference position Q (No in step S206), the CPU 62 determines whether the second sensor 90 detects the machine 10 (step S209).

When the second sensor 90 detects the machine (Yes in step S209), the position estimated in step S202 is likely to have an error. The CPU 62 thus performs a predetermined process (step S210). The predetermined process in this step may be the same or different from the predetermined process performed in step S208. The processing then advances to step S203.

When the second sensor 90 does not detect the machine 10 (No in step S209), the position estimated in step S202 is less likely to have an error. The processing advances to step S203.

Step S203 and subsequent steps are similar to the corresponding steps in the position estimation process in Embodiment 1, and are not described.

In the present embodiment described above, the predetermined process such as a warning process is performed when the machine 10 moved to the second reference position Q is detected by the second sensor 90 but is estimated not to be at the second reference position Q, or when the machine 10 is not detected by the second sensor 90 but is estimated to be at the second reference position. This allows early notification, to the user, of any lowered accuracy of position estimation resulting from, for example, aging deterioration of the ball screw 30 or loosening of the coupling connecting the ball screw 30 to the servomotor 20, thus reducing malfunctions.

Modifications

The present disclosure is not limited to the above embodiments, and various changes are possible without departing from the gist of the present disclosure.

For example, when the first sensor 50 detects the machine 10 in the position estimation process, reference position information stored in the reference state storage 653 may be updated with the rotation amount acquired by the encoder 40 at the same time as the detection. In other words, when the first sensor 50 detects the moving machine 10 during the operation of the movement system 100 or 200, the same processing as in steps S102 and S103 in the reference state registration process may be sequentially performed to update the reference state information stored in the reference state storage 653. This allows the reference position information to be updated to a latest value upon every movement of the machine 10 through the first reference position P, thus further improving the accuracy of position estimation without errors in movement position accumulating due to machine components, such as deflection of the ball screw 30 or loosening of the components.

In the above embodiments, the movable object is the machine 10. However, the movable object is not limited to the machine 10 in some embodiments of the present disclosure. In the above embodiments, the drive means for moving the machine 10 is the servomotor 20. However, the drive means is not limited to the servomotor 20 and includes, for example, other types of motors and drivers other than a motor in some embodiments of the present disclosure.

In the above embodiments, the position of the machine 10 is estimated using the rotation amount of the servomotor 20 detected by the encoder 40. However, the position of the machine 10 may be estimated using information indicating the state of the servomotor 20 other than the rotation amount. In one example, the position of the machine 10 may be estimated using information corresponding to the movement of the machine 10, such as the rotation speed or the counts of the servomotor 20 detected by the encoder 40. In another example, the position of the machine 10 may be estimated based on a value of the counts detected by the encoder 40 multiplied by the resolution of the encoder 40.

In the above embodiments, the encoder 40 is used to detect the state of the servomotor 20. However, other devices that can detect the state of the servomotor 20 may be used. For example, the encoder 40 may be replaced by a resolver or a gyroscope to detect the rotation amount of the servomotor 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique described in the embodiments of the present disclosure is applicable to a movement system for a production line at a factory.

REFERENCE SIGNS LIST 100, 200 Movement system
10 Machine
20 Servomotor
21 Servo amplifier
22 Servo driver
30 Ball screw
40 Encoder
50 First sensor
60 Controller
70 Display
80 Sound output device
90 Second sensor
P First reference position
Q Second reference position
61 Interface
62 CPU
63 ROM
64 RAM
65 Secondary storage device
651 Sensor information storage
652 Encoder information storage
653 Reference state storage
654 Area information storage
66 Bus

The invention claimed is:

1. A movement system, comprising:
a driver to move a movable object with a ball screw when the driver being driven and rotated;
a first detector to detect presence of the movable object at a first reference position at a predetermined time interval, the first reference position being predefined;

a second detector to detect presence of the movable object at a second reference position at a predetermined time interval, the second reference position being predefined;

a state detector to detect a rotation state of the driver at a predetermined time interval; and a controller to receive an input of information from the first detector and the state detector, wherein the controller includes a reference state storage to store the rotation state of the driver detected by the state detector as reference state information upon detection of the movable object by the first detector, and processing circuitry to estimate a position of the movable object based on the rotation state of the driver detected by the state detector and the reference state information, and perform a predetermined process (i) when the estimated position of the movable object upon detection of the movable object by the second detector is different from the second reference position or (ii) when the estimated position of the movable object without detection of the movable object by the second detector is the second reference position.

2. The movement system according to claim 1, wherein the controller further includes an area information storage to store area information indicating a specific area within a range in which the movable object is movable, and the processing circuitry determines, based on the estimated position and the area information, whether the movable object is within the specific area.

3. The movement system according to claim 1, wherein the processing circuitry updates, upon every detection of the movable object by the first detector, the reference state storage with the rotation state of the driver detected by the state detector at the detection as new reference state information.

4. The movement system according to claim 1, wherein the first detector, the second detector, and the state detector have been synchronized with one another, and detect (i) the presence of the movable object and (ii) the rotation state of the driver, at a same time.

5. The movement system according to claim 2, wherein the processing circuitry performs a process corresponding to the specific area when the movable object is determined to be within the specific area.

6. A position estimation method for a movable object to be moved with a ball screw with a driver being driven and rotated, the position estimation method comprising:

detecting presence of the movable object at a first reference position at a predetermined time interval, the first reference position being predefined;

detecting presence of the movable object at a second reference position at a predetermined time interval, the second reference position being predefined;

detecting a rotation state of the driver at a predetermined time interval;

storing, as reference state information, the rotation state of the driver upon detection of the movable object at the first reference position;

estimating a position of the movable object based on the rotation state of the driver and the reference state information; and performing a predetermined process (i) when the estimated position of the movable object upon detection of the movable object at the second reference position is different from the second reference position or (ii) when the estimated position of the movable object without detection of the movable object at the second reference position is the second reference position.

* * * * *